(12) United States Patent
Turner

(10) Patent No.: US 10,473,188 B2
(45) Date of Patent: Nov. 12, 2019

(54) SHACKLE GUARD AND SPACER WITH TETHER

(71) Applicant: Daystar Products International, Inc., Phoenix, AZ (US)

(72) Inventor: Mark Alan Turner, Phoenix, AZ (US)

(73) Assignee: Daystar Products International, Inc., Phoenix, AZ (US)

( * ) Notice: Subject to any disclaimer, the term of this patent is extended or adjusted under 35 U.S.C. 154(b) by 0 days.

(21) Appl. No.: 16/175,631

(22) Filed: Oct. 30, 2018

(65) Prior Publication Data

US 2019/0127184 A1    May 2, 2019

Related U.S. Application Data

(63) Continuation-in-part of application No. 16/045,699, filed on Jul. 25, 2018, which is a continuation-in-part of application No. 15/798,306, filed on Oct. 30, 2017, now Pat. No. 10,054,146.

(60) Provisional application No. 62/579,108, filed on Oct. 30, 2017.

(51) Int. Cl.
*F16G 11/12* (2006.01)
*F16G 15/06* (2006.01)
*F16B 21/12* (2006.01)
*B66C 1/22* (2006.01)

(52) U.S. Cl.
CPC .............. *F16G 15/06* (2013.01); *B66C 1/22* (2013.01); *F16B 21/125* (2013.01); *F16G 11/12* (2013.01)

(58) Field of Classification Search
CPC ... B66C 1/122; B66C 1/14; B66C 1/22; F16B 21/10; F16B 21/12; F16B 21/125; F16B 2021/14; F16G 11/12; F16G 15/06

USPC .......... 294/74, 82.1, 82.11, 82.12; 59/86, 93
See application file for complete search history.

(56) References Cited

U.S. PATENT DOCUMENTS

| 48,844 A | 7/1865 | Shogren |
| 1,527,281 A | 2/1925 | Stapfer |
| 3,224,185 A | 12/1965 | Grim et al. |
| 3,352,590 A | 11/1967 | Barthule |
| 3,462,945 A * | 8/1969 | Barber ................... F16G 15/06 294/82.35 |
| 4,137,704 A * | 2/1979 | Schreyer ................ F16G 15/06 59/86 |

(Continued)

OTHER PUBLICATIONS

Daystar product brochure and photos from brochure showing D Ring Isolators, 2009, 4 pages.

*Primary Examiner* — Dean J Kramer
(74) *Attorney, Agent, or Firm* — Lowe Graham Jones PLLC

(57) ABSTRACT

A guard defines an inner seat comprising an open channel shaped to receive a shackle and extend partially around the shackle. The guard further includes an outer seat positioned opposite the open channel and shaped to support a strap passing through the shackle. A tether is fastened to the guard and defines a fastener for securing to a closure pin passing through the shackle. The fastener may be a hole formed in the tether and a barb formed on the tether offset from the hole, a barb on the tether that inserts through a hole in the closure pin, a cup on the tether that is positioned over an end of the closure pin, or a hooked or straight tether. The tether and fastener may be secured to a spacer through which the closure pin is inserted. A closure pin may insert through a pair of spacers.

18 Claims, 11 Drawing Sheets

(56) References Cited

U.S. PATENT DOCUMENTS

| | | | |
|---|---|---|---|
| 4,234,990 A * | 11/1980 | Colburn | B63B 35/7933 |
| | | | 403/157 |
| 4,303,362 A * | 12/1981 | Lockhart | F16B 39/24 |
| | | | 123/195 C |
| 4,925,226 A | 5/1990 | Leonard, Jr. et al. | |
| 5,647,198 A | 7/1997 | Mihailovic | |
| 5,660,423 A | 8/1997 | Herman et al. | |
| 6,298,528 B1 | 10/2001 | Workman | |
| 8,434,800 B1 * | 5/2013 | LeBlanc | B66C 1/28 |
| | | | 294/106 |
| 9,314,836 B2 | 4/2016 | Ogden et al. | |
| 2012/0201599 A1 | 8/2012 | Reppen | |
| 2016/0158110 A1 * | 6/2016 | Swisher | A61J 15/0026 |
| | | | 604/535 |

\* cited by examiner

SHACKLE GUARD AND SPACER WITH TETHER

CROSS-REFERENCE TO RELATED APPLICATIONS

This application claims the benefit of priority from U.S. Patent Application No. 62/579,108 filed Oct. 30, 2017, and is a continuation-in-part of U.S. patent application Ser. No. 16/045,699 filed Jul. 25, 2018, which is a continuation-in-part of U.S. patent application Ser. No. 15/798,306 filed Oct. 30, 2017, which applications are incorporated herein by reference in their entireties.

FIELD OF THE INVENTION

This invention relates to shackles to which lifting straps may be secured for hoisting materials.

BACKGROUND OF THE INVENTION

D-rings are used on equipment and vehicles as a point to lift or connect straps. The D-rings typically include a shackle with through holes on two arms. A screw or bolt passes through the holes and is secured in place, such as by a threaded connection in one of the holes. A lifting machine is fastened to the pin, such as by the pin passing through a hole in a connector fastened to the lifting machine. Straps then pass over the shackle and carry materials to be lifted. As machinery moves the D-ring, the pin may unscrew, allowing the D-ring to detach and any load to fall to the ground.

The apparatus disclosed herein provides a device for improving the function and appearance of D-rings.

SUMMARY OF THE INVENTION

In one aspect of the invention an apparatus includes a guard defining an inner seat comprising an open channel shaped to receive a shackle and extend partially around the shackle. The guard further includes an outer seat positioned opposite the open channel and shaped to support a strap passing through the shackle. The apparatus further includes a tether fastened to the guard and defining a fastener for securing to a closure pin passing through the shackle.

The open channel may have an arcuate axis. In some embodiments, along the arcuate axis, a wall of the open channel is arcuate in a plane to which the arcuate axis is normal. In some embodiments, outer edges of the wall include one or more indentations. In some embodiments, the tether secures to an outer edge of the wall. In some embodiments, the tether is co-molded with the guard. In some embodiments, the outer seat has an arcuate shape that is concentric with the arcuate axis.

In some embodiments, the fastener comprises a hole formed in the tether and a barb formed on the tether offset from the hole. In some embodiments, the fastener comprises a hole formed in the tether and offset from a distal end of the tether and a barb at the distal end of the tether for insertion within the hole.

In use, the shackle is seated within the open channel and a closure pin is inserted through the shackle having the fastener securing the tether to the closure pin.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
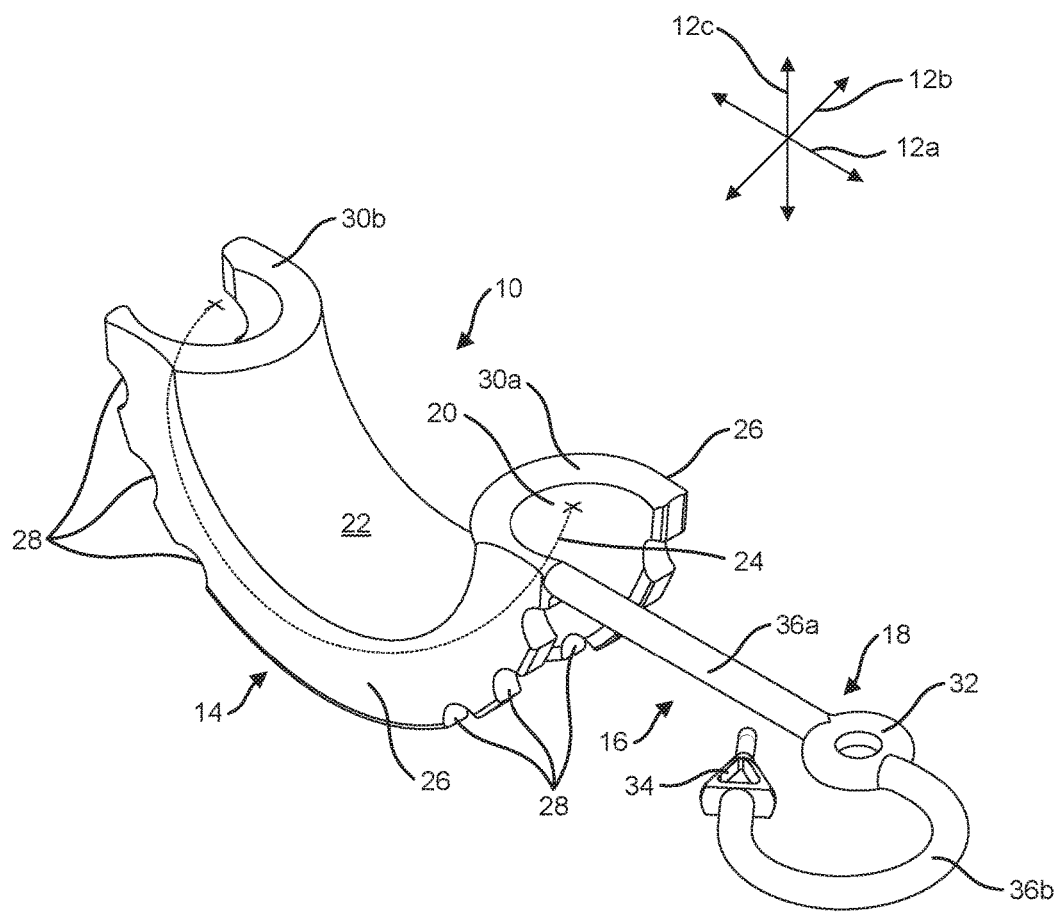
FIG. 1 is an isometric view of a shackle guard with a tether in accordance with an embodiment of the present invention.

Referring to FIG. 1, an apparatus 10 as described herein may be understood with respect to a longitudinal direction 12a, a horizontal direction 12b and a vertical direction 12c that are all mutually perpendicular.

The apparatus 10 includes a guard 14 and a tether 16 fastened to the guard 14. A fastener 18 is mounted on the tether 16 for securing the tether 16 to the pin of a D-ring. The guard 14 defines channel 20 for receiving the shackle of a D-ring and an outer seat 22 for supporting a strap passing through the shackle.

As is apparent in FIG. 1, the axis 24 of the channel 20 defines an arcuate path in a plane parallel to the longitudinal and vertical directions 12a, 12c ("a longitudinal-vertical plane"). The path followed by the axis 24 and any variation in the cross sectional shape of the channel 20 along the axis 24 may conform to a shackle of a D-ring. For example, in the illustrated embodiment, the channel 20 conforms to a toroidal shape. The axis 24 may therefore be defined as the center of the circular cross sections of the toroidal shape.

The channel 20 is open along its axis 24 in order to permit insertion of the shackle. In each plane to which the axis 24 is normal, the channel 20 may have an arcuate shape. Where a portion of the shackle has a toroidal shape, the shape of the channel 20 in each plane may be semicircular, e.g., an arc of N degrees. Where N is greater than 180 degrees, deformation of the guard 14 may be required to place the guard 14 on a shackle and therefore the guard 14 operates as a self-retaining clip. In the illustrated embodiment N is 200 degrees. In other examples, N may be an angle between 180 and 220 degrees, preferably between 185 and 200 degrees.

The outer seat 22 may likewise have an arcuate shape in a longitudinal-vertical plane and may also have portion thereof that conforms to a toroidal shape, particularly where the channel 20 also conforms to a toroidal shape of a smaller diameter. The rounded outer seat 22 may facilitate use with straps without cutting or snagging on the straps.

In the illustrated embodiment, the guard 14 may include flattened walls 26 that do not conform to the toroidal shape as does the outer seat 22. In particular, the walls 26 may be planar parallel to a longitudinal-vertical plane and offset from one another along the horizontal direction 12b. As is apparent, the lower edges of the walls 26 are semicircular in a longitudinal-vertical plane. In the illustrated embodiment, indentations 28 are formed in the walls 26 and that protrude inwardly from the lower edges of the walls 26 in a longitudinal-vertical plane intersecting the walls 26.

In the illustrated embodiment, the indentations 28 are non-uniformly distributed and may serve a primarily decorative function, e.g., simulating a look of a tire tread. Likewise, the planar side walls 26 may also be a decorative feature rather than having a functional purpose.

In the illustrated embodiment, the guard 14 includes ends 30a, 30b, which may be planar and parallel to one another. The ends 30a, 30b may be coplanar with one another. For example, the axis 24 of the channel 20 may have an arcuate shape and may have an arc length of 180 degrees such that the end 30a, 30b are coplanar on a plane that is perpendicular at its points of intersection with the axis 24. The end 30a, 30b are primarily decorative and may therefore have any angle or shape. For example, the ends 30a, 30b may be chamfered or be other than parallel to one another.

In the illustrated embodiment, the tether 16 secures to the guard 14 near one of the ends 30a. For example, the tether 16 may have a circular cross section that is tangent to the planar end 30a. The cross section and point of securement of the tether 16 is primarily decorative. Accordingly, the cross section could be any other shape, such as square, rectangular, or the like. Likewise, the tether 16 may secure at various points along the lower edge of either wall 26 or at any other point on the guard 14.

The fastener 18 in the illustrated embodiment is selected for its appearance when fastened and when unfastened. In the illustrated embodiment, the fastener includes a ring 32 and a barb 34 sized to insert within the ring 32. The ring 32 is secured between a proximal portion 36a and a distal portion 36b of the tether 16. The barb 34 is secured at the distal end of the distal portion. In this manner, distal portion 36b may be bent until the barb 34 is inserted through the ring 32. The barb 34 is deformable to insert through the ring 32 and thereafter resists removal unless sufficient force is applied to deform one or both of the barb 34 and ring 32 and force the barb 34 back through the ring 32. The ring 32 may be any shape (square, octagonal, etc.) and may include an opening of any shape as well that permits insertion of the barb 34 and resists removal.

Other variations are also possible. For example, the ring 32 may be formed at the distal end of the distal portion 36b whereas the barb 34 protrudes outwardly from a point between the proximal and distal portions 36a, 36b.

In the illustrated embodiment, the tether 16 and guard 14 are co-molded of the same material such as a resilient polymer. For example, polyurethane is used for its strength, durability, and resistance to UV light. For purposes of this application a resilient polymer may be understood to be a polymer with a Young's Modulus of between 1.1 and 50 Mpa.

Figure 2:
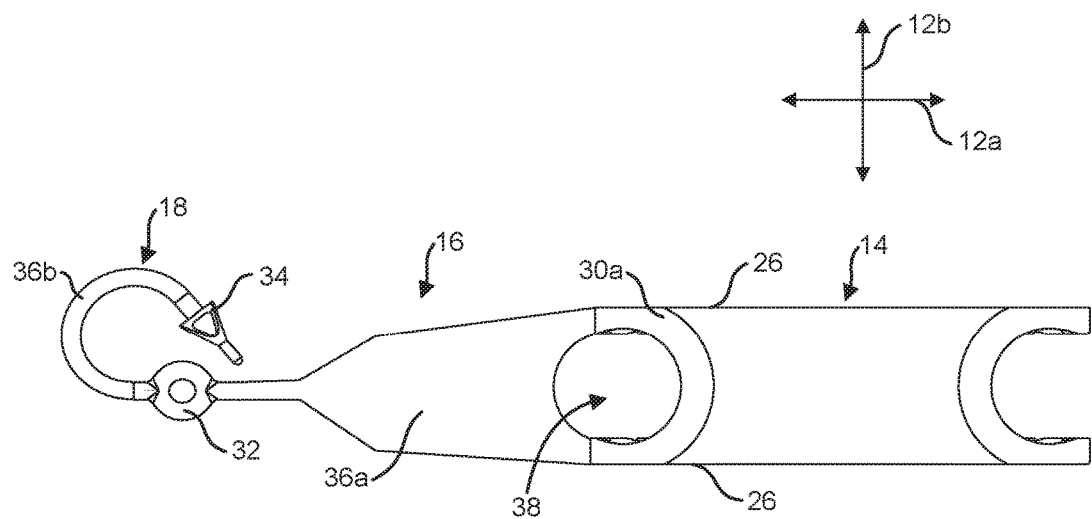
FIG. 2 is a top view of an alternative embodiment of a shackle guard with a tether in accordance with an embodiment of the present invention.
Figure 3:
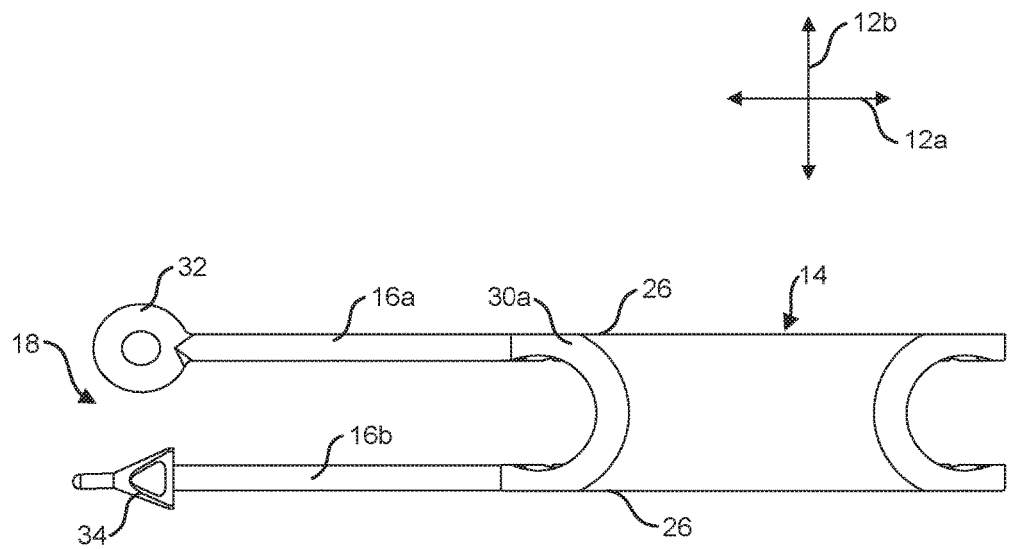
FIG. 3 is a top view of another alternative embodiment of a shackle guard with a tether in accordance with an embodiment of the present invention.

Referring to FIGS. 2 and 3, various other configurations of the tether 16 may be used for both utility and decorative function. In the embodiment of FIG. 2, the tether 16 secures to both walls 26 and defines an opening 38 with the end 30a in order to permit insertion of the shackle of a D-ring. The tether 16 of FIG. 2 may advantageously provide a larger surface for being logos or other decorative elements and also for resisting rotation of a pin of a D-ring. In the illustrated embodiment, some or all of the proximal portion 36a is flattened and some of the proximal portion 36a, such as a distal portion thereof, may be flattened or retain a round cross section. The distal portion 36b may be flattened or may retain a round cross section as for the embodiment of FIG. 1.

In the embodiment of FIG. 3, the tether 16 includes two tethers 16a, 16b secured each secured to one of the walls 26, such as at the end 30a of the guard 14. The tethers 16a, 16b may be of equal or unequal length and may enhance the visual appeal of the apparatus 10 by being more symmetrical than the single tether embodiment. In the illustrated embodiment, the ring 32 secures to a distal end of one tether 16a and the barb 34 secures to the distal end of the other tether 16b.

Figure 4:
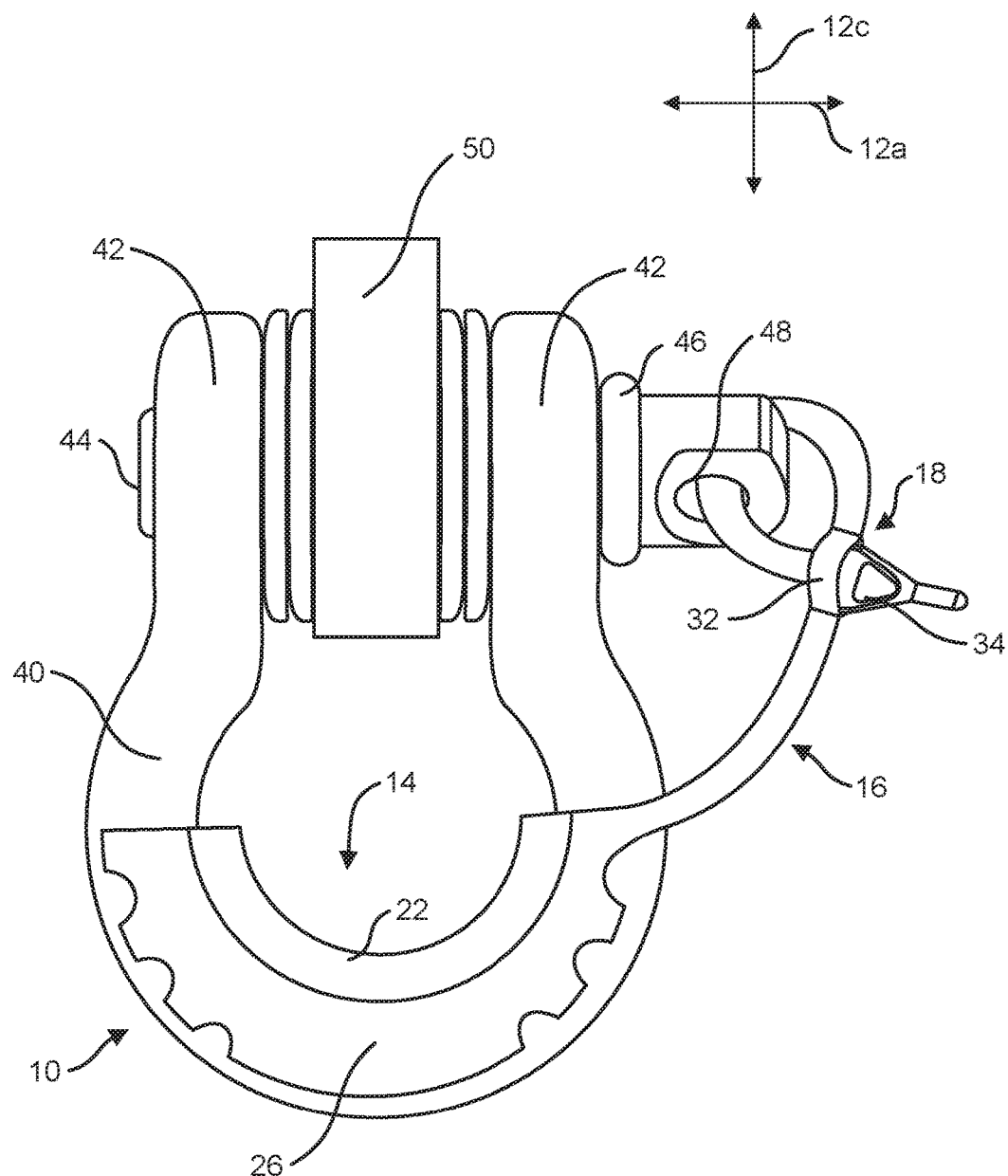
FIG. 4 illustrates a D-ring having the shackle guard and tether of FIG. 1 installed on the shackle and the tether engaging the pin in accordance with an embodiment of the present invention.

FIG. 4 illustrates an example use of the apparatus 10 on the shackle 40 of a D-ring. As shown the shackle includes a toroidal-shaped portion 40 that seats within the channel 20. The shackle 40 includes arms 42 including holes through which a pin 44 inserts. One of the holes is threaded (left side) such that the pin 44 may threadably secure therein. A head 46 of the pin 44 cooperates with the threaded engagement to prevent removal of the pin 44. The head 46 may have two or more flattened surface to facilitate tightening, such as a hexagonal shape.

The tether 16 extends outwardly from the shackle and is bent until it passes through a hole 48 in the head 46 of the pin 44. The barb 34 is then inserted through the ring 32 such that a loop of the tether 16 passes through the hole 48. In other embodiments, an end of the pin opposite the head 46 protrudes outwardly from the shackle and includes the hole 48 for receiving the tether 16. Where the embodiment of FIG. 3 is used, one tether 16a passes through the hole 48 and secures to the other tether 16b.

Securement of the tether 16 to the pin 44 reduces rotation of the pin 44 due to vibration and reduces the likelihood of accidental loosening of the pin 44. Accordingly, in addition to any decorative function of the tether 16 it may be sufficiently rigid to resist rotation.

In the configuration shown a strap may be passed over the outer seat 22 and walls 26 of the guard 14 and secured to a load. The pin 44 may pass through a connector 50 which is secured to lifting machinery. Vibration and twisting of the pin 44 that may unthread it during lifting is resisted by the tether. The guard 14 and tether 16 are typically formed of a colorful (bright, red, blue, yellow, etc.) material thereby enhancing the visual appeal of the apparatus in combination with a D-ring.

Figure 5:
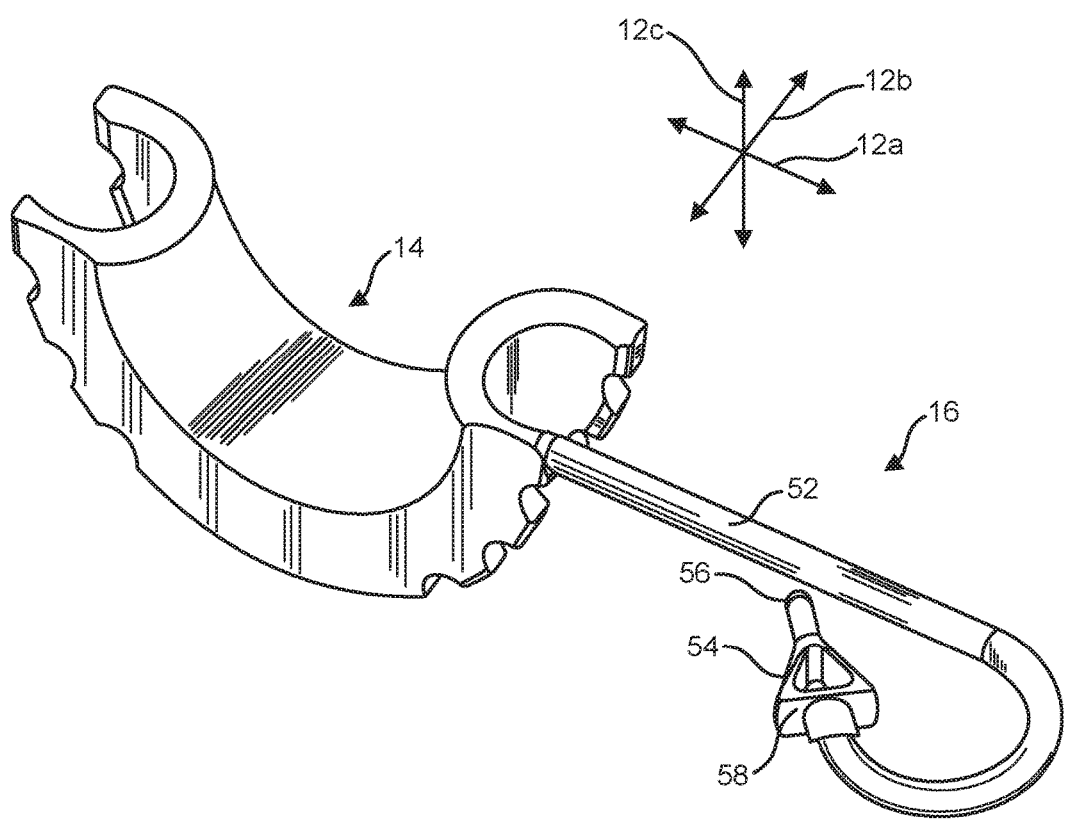
FIG. 5 is an isometric view of another alternative embodiment of a shackle guard with a tether in accordance with an embodiment of the present invention.

Referring to FIG. 5, in another embodiment, the guard 14 as described according to any of the foregoing embodiments may have a tether 16 embodied as a flexible rod 52 having a barb 54 secured to a distal end of the rod 52. The barb 54 includes a small end 56, a wide end 58, and a tapered shape between the small end 56 and the wide end 58, such as a triangular, conical, pyramidal, or other tapered shape. In the illustrated embodiment, the barb 54 is hollow or includes an aperture passing therethrough to increase flexibility, though this may be omitted in other embodiments. The distal end of the rod 52 secures to the wide end 58. The rod 52 may be straight when un-deformed or may be curved when un-deformed as in other embodiments disclosed herein.

Figure 6:
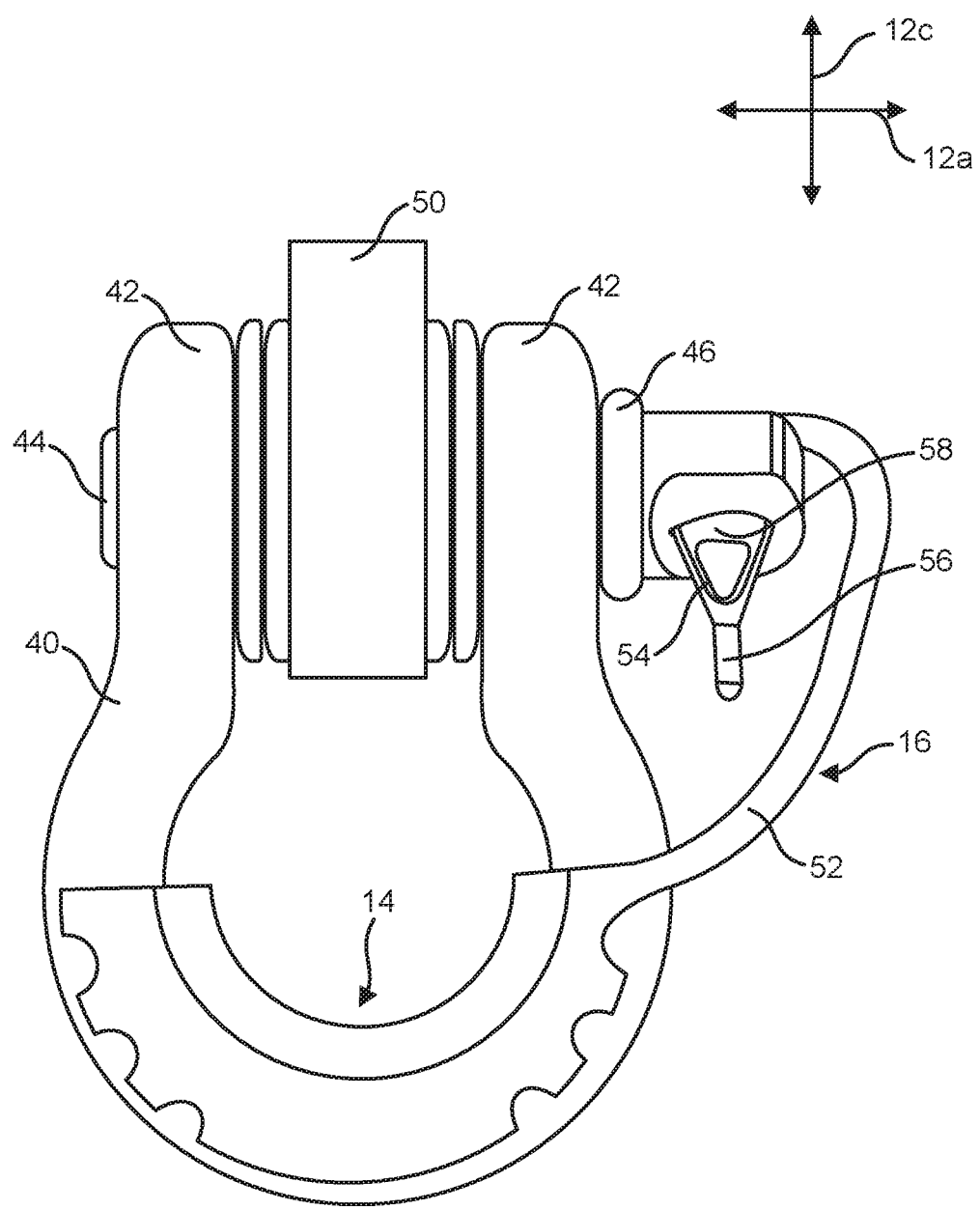
FIG. 6 illustrates a D-ring having the shackle guard and tether of FIG. 5 installed on the shackle and the tether engaging the pin in accordance with an embodiment of the present invention.

Referring to FIG. 6, in use, the barb 54 is forced through the opening 48 (see FIG. 4) in the closure pin 44, which requires deformation of the wide end 58 due to the wide end 58 being too large to fit through the opening 48 without deforming. As for other embodiments, the barb 54 and rod 52 may be made a resilient polymer such as polyurethane. The barb 54 and rod 52 are therefore able to deform and flex to permit this deformation. After the barb 54 is inserted through the opening 48, the wide end 58 expands and resists removal unless sufficient force is applied to deform the wide end 58 and force it to pass through the opening 48.

After the barb 54 is inserted, the rod 52 resists rotation of the closure pin 44 that might be caused by cyclic loading, vibration, or other cause thereby reducing likelihood of accidental detachment. Note that in the illustrated embodiment, the rod 52 doubles back and passes through the opening 48 similar to the embodiment of FIG. 4. In other embodiments or manners of use, the rod 52 extends directly from its point of attachment to the guard 14 and passes through the opening 48 either with or without some bending (e.g., 0 to 90 degrees) due to misalignment with the axis of the opening 48. The rod 52, barb 54, and guard 14 may be a single monolithic member due to co-molding or other manufacturing approach. The barb 54 may secure to the guard 14 by securing to a tether portion 36a as shown in FIG. 2.

Figure 7:
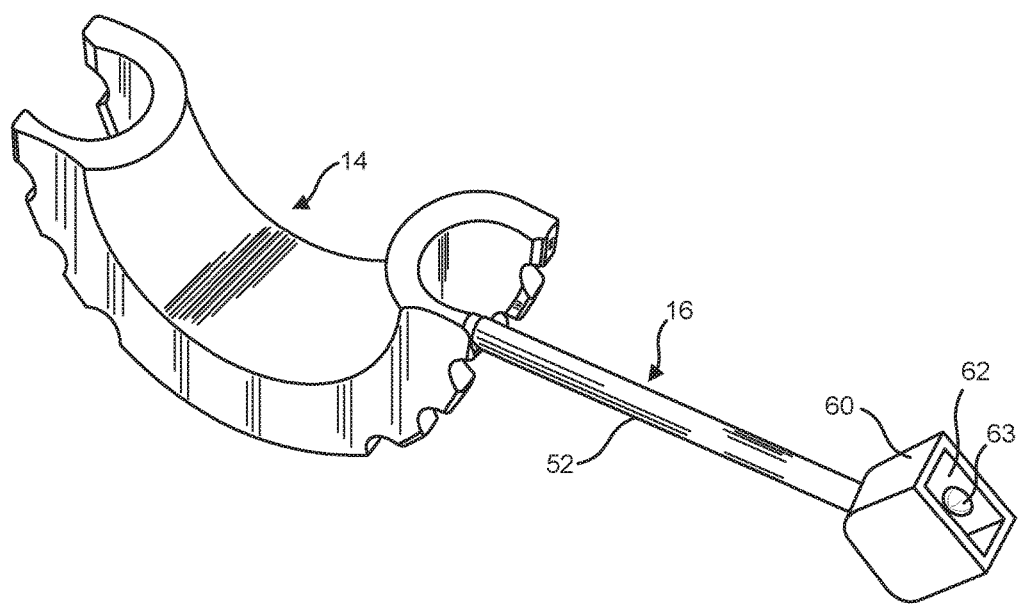
FIG. 7 is an isometric view of another alternative embodiment of a shackle guard with a tether in accordance with an embodiment of the present invention.

Referring to FIG. 7, in another embodiment, a cup 60 defining a concave interior cavity 62 secures to the distal end of the rod 52. In particular, the cup 60 may face away from a point of attachment of the rod 52. The cup 60 may define a central axis of the cavity 62 that is parallel to the central axis of the rod 52 extending from the guard 14 to the cup 60 when un-deformed. Alternatively, the central axis of the cavity 62 may be at an angle (e.g., between 15 and 90 degrees) relative to the central axis of the rod 52.

The cavity 62 may further include one or more protuberances 63 (e.g., a cylindrical or hemispherical protuberance) that are sized and positioned to extend into the opening 48 when the cup 60 is positioned over the head 46 thereby further resisting removal. For example, the illustrated protuberance 63 may be used alone or with another protuberance on the opposite wall of the cavity 62. The protuberance 63 may have a radius (hemispherical or cylindrical) that is less than or equal to the radius of the opening 48. In other embodiments, the radius of the protuberance 63 is greater than the radius of the opening 48 such that deformation is required to insert the protuberance into the opening 48.

Figure 8:
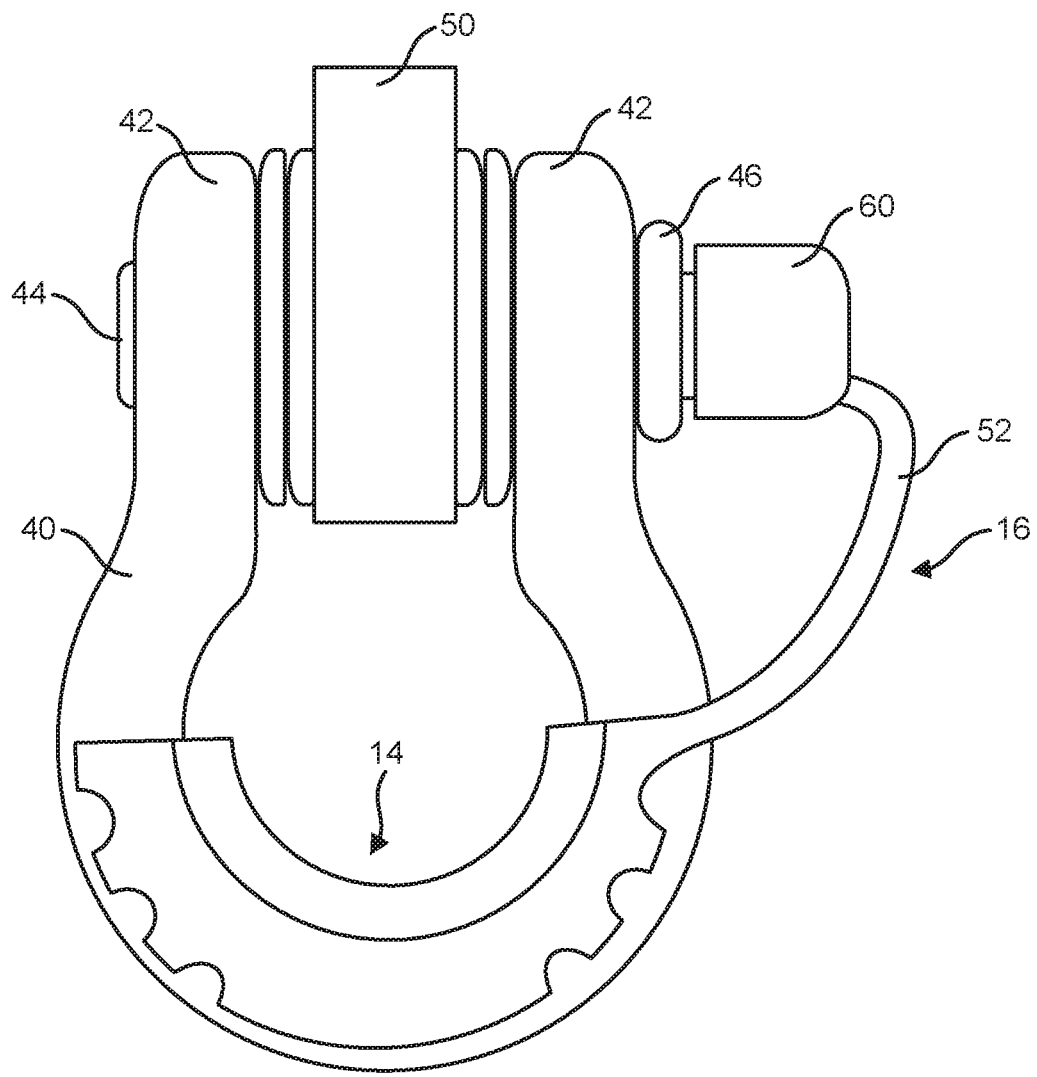
FIG. 8 illustrates a D-ring having the shackle guard and tether of FIG. 7 installed on the shackle and the tether engaging the pin in accordance with an embodiment of the present invention.

As shown in FIG. 8, the cup 60 is sized to fit over at least a portion of the head 46 of the pin 44. In particular, the cavity 62 may be sized smaller than the head 46 of the pin 44 such that insertion of the head 46 into the cavity 62 requires deformation of the cup 60. Accordingly, a restoring force exerted by the cup 60 resists removal of the head 46 from the cavity 62. As noted above, the head 46 may have flattened surfaces. The cavity 62 may have corresponding flat surfaces that engage these flattened surfaces of the head 46 thereby resisting rotation of the head 46 within the cavity 46.

In embodiments where one or more protuberances 63 are used, the cavity 62 may be sized equal to or larger than the portion of the head 46 over which it passes and engagement of the protuberances 63 with the opening 48 resists removal of the cup 60. However, deformation of the cup 60 and protuberances 63 may still be required to install the cup 60 and protuberances 63 over the head 46 of the pin 44.

When engaged, the cup 60 and rod 52 resist rotation of the pin 44 due to vibration, cyclic loading, or other causes. As for other embodiments, the cup 60 and rod 52 may be made of a resilient polymer, such as polyurethane, that permits deformation to engage the cup 60 over the head 46 of the pin 44 without tearing and while providing sufficient elasticity to retain the cup 60 on the head 46. As for other embodiments, the cup 60, rod 52 and guard 14 may be co-molded or otherwise be one monolithic piece of material.

Figure 9:
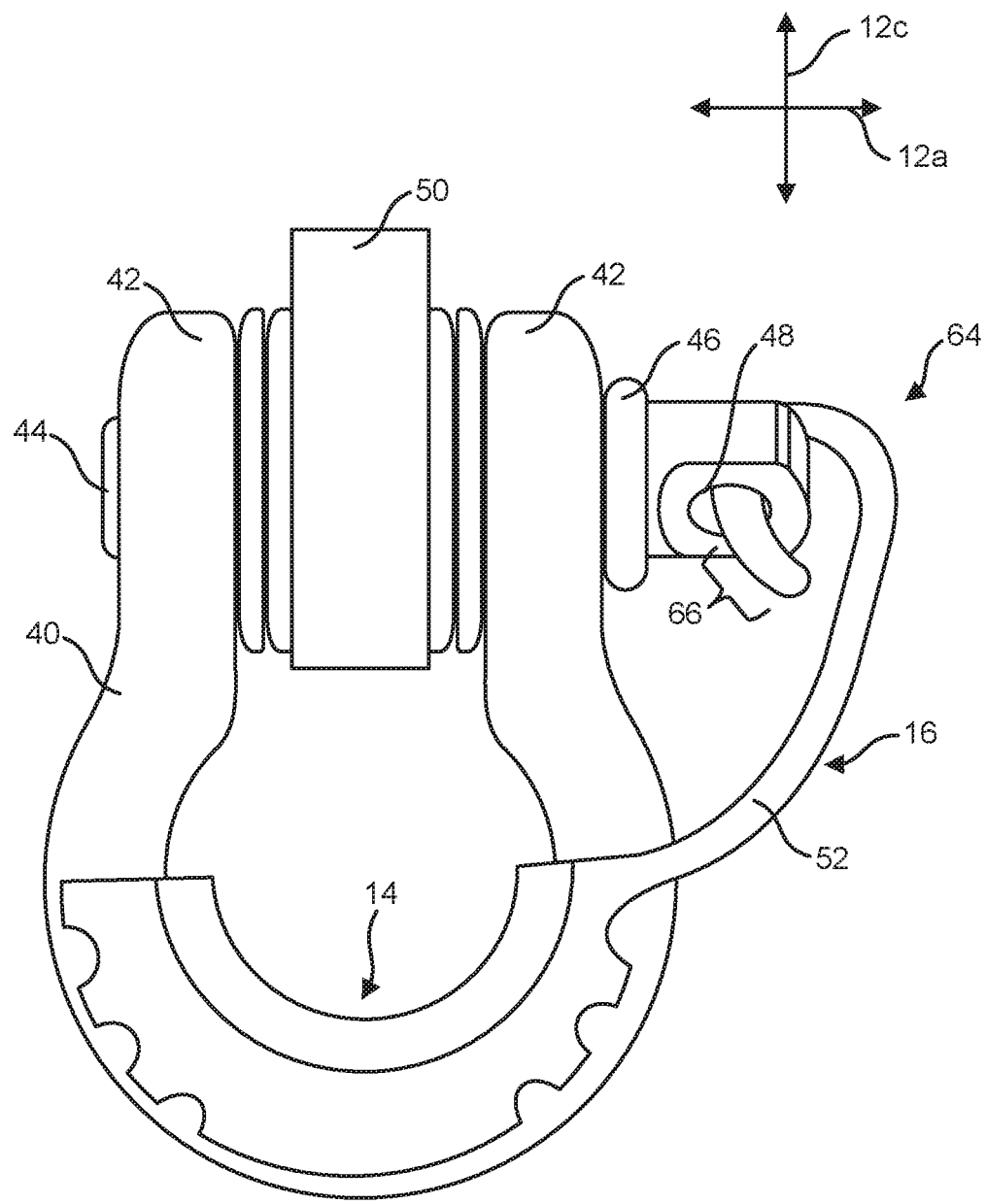
FIG. 9 illustrates a D-ring having a shackle guard with an alternative embodiment of a tether and a fastener in accordance with an embodiment of the present invention.

FIG. 9 shows an embodiment where the fastener 18 is embodied as a hooked portion 64 at a distal end of the rod 52 that is sufficiently resilient to elastically deform to permit insertion within the opening 48 but sufficiently rigid to retain itself within the opening 48 and resist rotation of the pin 44. The hooked portion 64 may be sufficiently long that a portion 66 at the end of the hooked portion 64 extends outwardly through the opening 48 sufficient to resist removal, such as between 0.5 and 0.75 inches. As for other embodiments, rod 52, hooked portion 64, and guard 14 may be co-molded or otherwise be one monolithic piece of material, such as polyurethane or other resilient polymer.

Figure 10:
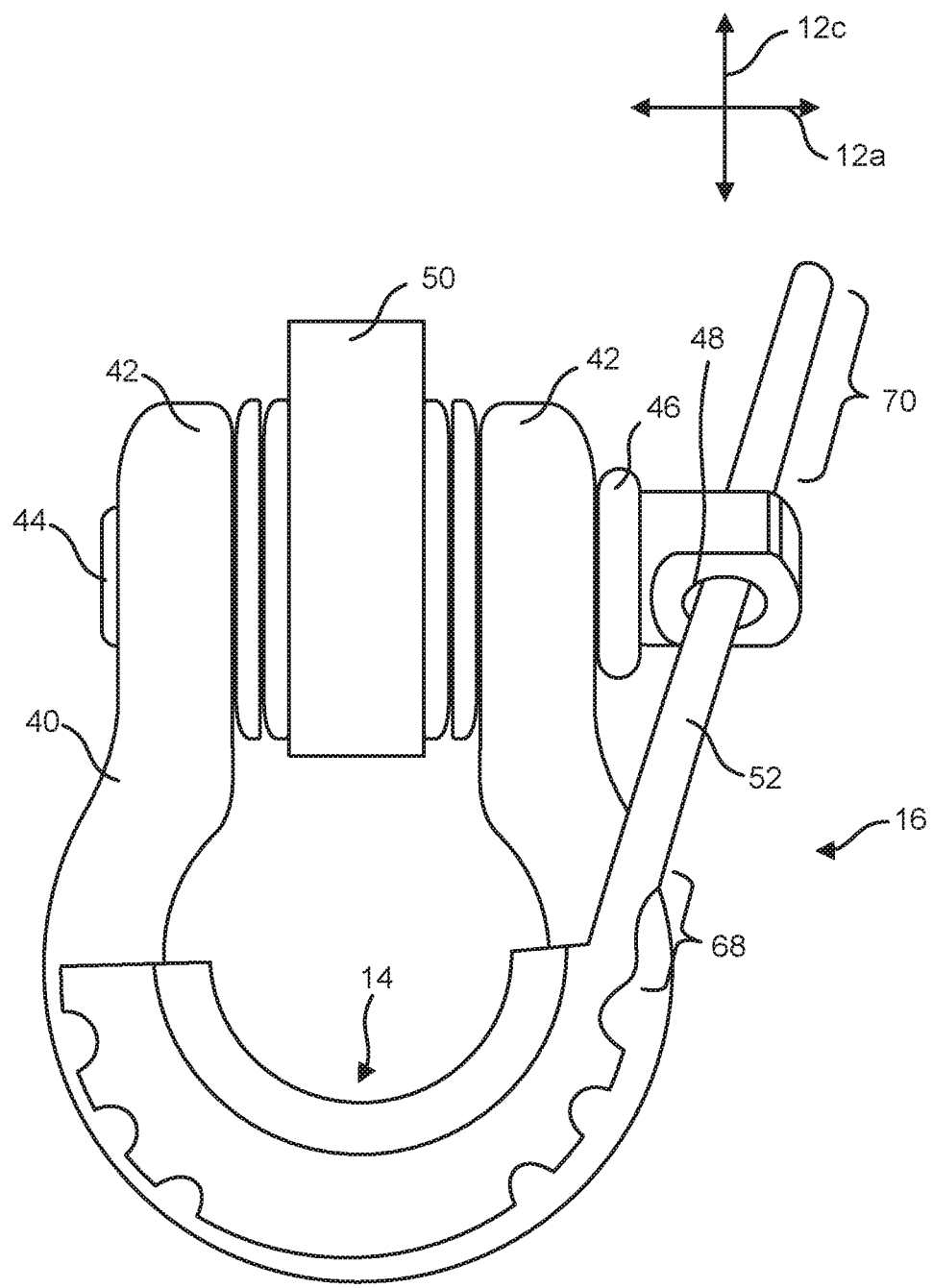
FIG. 10 illustrates a D-ring having a shackle guard within an alternative embodiment of a tether and a fastener in accordance with an embodiment of the present invention.

FIG. 10 shows an embodiment wherein only a straight rod 52 is used without a hook or barb but the rod 52 has sufficient length and rigidity to pass through the opening 48 and resist rotation of the pin 44. For example, the rod 52 may be of uniform cross section or include a portion 68 between the rod 52 and the guard 14 that is more flexible than portions of the rod distal of the portion 68. In this manner the rod 70 may be twisted in order to permit insertion through the opening 48. The rod 52 may be of sufficient length that the portion 70 extending outwardly from the opening 48 will resist accidental removal of the rod 52. For example, the portion 70 may be between 0.5 and 1.5 inches in length. As for other embodiments, rod 52 and guard 14 may be co-molded or otherwise be one monolithic piece of material, such as polyurethane or other resilient polymer.

In another approach, the rod 52 may be passed through the opening 48 prior to placing the guard 14 on the shackle 40. The guard 14 may then be placed on the shackle 40. In such an approach, the flexibility of the rod 52 may be reduced and the more flexible portion 68 may be omitted.

In the embodiment of FIG. 10, the rod 52 is preferably semi rigid. For example, when supported horizontally at its ends, the rod 52 may deflect vertically less than 10 percent of its length in response to a vertical load of between 0.5 and 2 pounds applied at mid span.

The illustrated embodiments are exemplary only. Various other fastening approaches are also contemplated to secure the tether 16 to the pin 46, such as a snap fastener secured to the tether 16 or any other type of removable fastening system.

Figure 11:
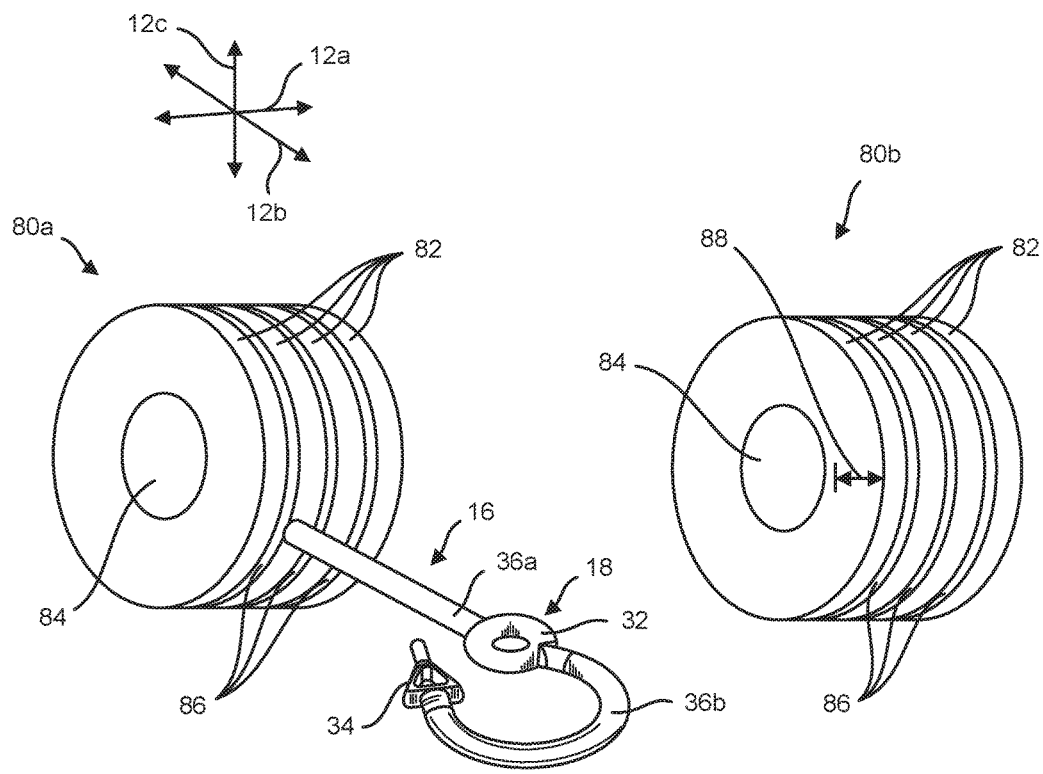
FIG. 11 is an isometric view of spacers incorporating a tether in accordance with an embodiment of the present invention.
Figure 12:
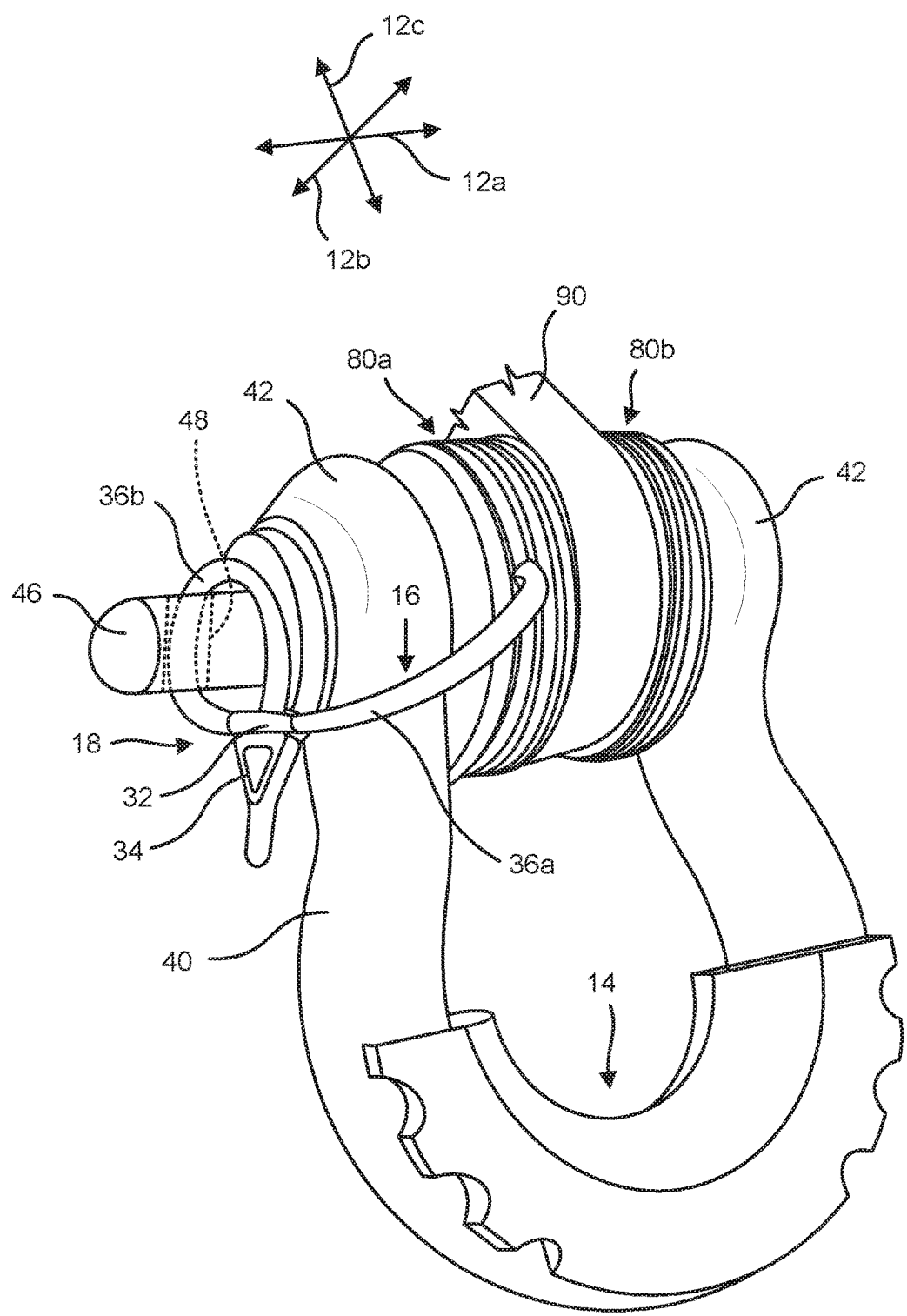
FIG. 12 is an isometric view of the spacers of FIG. 11 mounted on a D-ring in accordance with an embodiment of the present invention.

Referring to FIGS. 11 and 12, a tether 16 and fastener 18 according to any of the embodiments of 1 through 10 may be positioned to engage a closure pin 44 (e.g., the head 46 of the closure pin 44) using the illustrated configuration. In particular, the tether 16 is shown secured to one of two spacers 80a, 80b through which the closure pin 44 may be inserted. The spacers 80a, 80b and the parts thereof discussed below may be made of a resilient polymer, such may be any of the resilient polymers discussed above with respect to the embodiments of FIGS. 1 through 10. The spacer 80a, tether 16, and fastener 18 may be comolded.

In the illustrated example, the tether 16 is shown as the portions 36a, 36b, ring 32, and barb 34 of FIG. 1 which engage the pin 46 (e.g., an aperture 48 in the head 46 of the pin 44) in the same manner shown in FIG. 4. The portion 36b is passed through the aperture 48 in the head 46. The barb 34 is then passed through the ring 32 in order to secure the spacer 80a to the head 46 thereby resisting rotation of the closure pin 44.

Note that the tether 16 and fastener 18 of FIGS. 1 through 4 are shown secured to spacer 80a. The tether 16 and fastener 18 in the embodiment of FIG. 11 may have any of the configurations described above for the tether 16 and tether 18 of FIGS. 1 through 4. However, any of the approaches described above for resisting rotation of a closure pin 44 may be used. For example, the tethers 16a, 16b and ring 32 and barb 34 of FIG. 3 may be secured to the spacer 80a. A tether 16 embodied as the tether 52 and barb (54, 56, 68) of FIG. 5 may be fastened to the spacer 80a and engage the pin 46 in the manner shown in FIG. 6. The tether 16 having the cup 60 of FIG. 7 may secure to the spacer 80a and engage the head 46 of the pin 44 in the manner shown in FIG. 8. The tether 16 secured to the spacer 80a may also have the form of the tethers 16 shown in FIG. 9 or FIG. 10.

Each spacer 80a, 80b may be defined as one or more rings 82 made of an elastomeric material, such as any of the resilient polymers used to construct the embodiments of FIGS. 1 through 10. The rings 82 may be completely separable thereby enabling the number of rings 82 in each spacer 80a, 80b to be customized. In such an embodiment, one of the rings 82 of one of the spacers 80a, 80b may have the tether 16 secured to an outer surface thereof, e.g. the cylindrical outer surface of one of the rings 82.

Each spacer 80a, 80b may define a central aperture 84. Where each spacer is formed of separate rings 82, each ring 82 defines a part of the aperture 84. The cylindrical outer surfaces of the rings 82 may be concentric with the aperture 84, which may also be cylindrical in shape.

Although rings 82 and apertures 84 are shown as cylindrical in the illustrated embodiment, the outer perimeter of the rings 82 and apertures 84 may have any desired shape, such as square, octagonal, triangular, or the like.

In some embodiments, each spacer 80a, 80b is a single monolithic member such that the rings 82 are defined by circumferential grooves 86 extending inwardly around the spacer 80a, 80b concentric with the aperture 84 and extending inwardly to a radial depth 88 that is less than a radial distance between the outer circumference of the rings 82 and the central aperture 84.

Referring specifically to FIG. 12, in use, the closure pin 44 may be inserted through the arms 42 of a shackle 40 and the central apertures 84 of the spacers 80a, 80b such that the spacers 80a, 80b are positioned between the arms 42 of the shackle 40. A joining member 90 defines an aperture through which the closure pin 44 also passes. The joining member 90 may be positioned between the spacers 80a, 80b such that the spacers 80a, 80b help maintain the joining member 90 at a central position on the closure pin 46 and prevents direct impacts of the joining member 90 on the arms 42 of the shackle 40. The spacers 80a, 80b may also function to reduce rattling of the joining member 90 relative to the closure pin 44. The fastener 18 on the tether 16 may then be secured to the head 46 of the closure pin 44, such as by passing portion 36b through the aperture 48 and inserting the barb 34 through the ring 32 as shown.

In the illustrated embodiment, a guard 14 may be secured on the shackle 40 in the same manner as for other embodiments described above and used to support a strap passing through the shackle 40 as for other embodiments disclosed herein. The guard 14 in FIG. 12 may have the same attributes as the guard 14 described above with respect to FIGS. 1 through 10 except that no tether 16 is secured thereto. In other embodiments, a fixed tether secures the one or both spacers 80a, 80b to the guard 14.

The joining member 90 may be secured to a chain for hoisting items strapped to the shackle 40. The joining member 90 may be fastened to a vehicle or other structure. For example, the joining member 90 may be a flange for towing the vehicle or for securing items to be towed.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus comprising:
   an elastomeric member defining a central aperture defining a central axis; and
   a tether fastened to the elastomeric member and defining a fastener for securing to a closure pin passing through the central aperture;
   wherein the tether and fastener are co-molded with the elastomeric member;
   wherein the fastener comprises:
      a first fastening element defined by the tether offset from a distal end of the tether; and
      a second fastening element defined by the tether at the distal end of the tether and selectively fastenable to the first fastening element to form a loop in the tether.

2. The apparatus of claim 1, wherein the elastomeric member is a first elastomeric member, the apparatus further comprising one or more second elastomeric members.

3. The apparatus of claim 2, wherein the one or more second elastomeric members have no tether fastened thereto.

4. The apparatus of claim 1, wherein the tether secures to an outer edge of the elastomeric member.

5. An apparatus comprising:
   an elastomeric member defining a central aperture defining a central axis; and
   a tether fastened to the elastomeric member and defining a fastener for securing to a closure pin passing through the central aperture;
   wherein the tether and fastener are co-molded with the elastomeric member; and
   wherein the elastomeric member further comprises a plurality of circumferential grooves extending around the central axis and extending inwardly from an outer surface of the elastomeric member.

6. An apparatus comprising:
   an elastomeric member defining a central aperture defining a central axis; and
   a tether fastened to the elastomeric member and defining a fastener for securing to a closure pin passing through the central aperture;
   wherein the fastener comprises a hole formed in the tether and a barb formed on the tether offset from the hole.

7. The apparatus of claim 6, wherein:
   the hole is offset from a distal end of the tether; and
   the barb is at the distal end of the tether for insertion within the hole.

8. An apparatus comprising:
   an elastomeric member defining a central aperture defining a central axis; and a tether fastened to the elastomeric member and defining a fastener for securing to a closure pin passing through the central aperture a guard comprising:
an inner seat comprising an open channel shaped to receive a shackle and extend partially around the shackle; and
an outer seat positioned opposite the open channel and shaped to support a strap passing through the shackle.

9. The apparatus of claim 8, wherein the guard is detached from the first elastomeric member and has no tether secured thereto.

10. The apparatus of claim 8, wherein:
the open channel has an arcuate axis; and
along the arcuate axis, a wall of the open channel is arcuate in a plane to which the arcuate axis is normal.

11. The apparatus of claim 8, wherein the elastomeric member is a first elastomeric member and the central aperture is a first central aperture, the apparatus further comprising:
a second elastomeric member including a second central aperture;
the shackle seated within the open channel; and
the closure pin inserted through the shackle, the first central aperture, and the second central aperture and having the fastener securing the tether to the closure pin.

12. The apparatus of claim 11, further comprising a joining member defining a joining aperture, the closure pin being inserted through the joining aperture having the first elastomeric member on a first side of the joining member and a second elastomeric member positioned on a second side of the joining member, the first elastomeric member and the second elastomeric member being positioned between arms of the shackle.

13. A method comprising:
providing an elastomeric member defining a central aperture defining a central axis;
providing a tether secured to the elastomeric member and defining a fastener for securing to a closure pin passing through a central aperture; and
inserting the closure pin through the central aperture and through arms of a shackle; and
fastening the fastener to the closure pin;
wherein the elastomeric member is a first elastomeric member and the central aperture is a first central aperture, the method further comprising:
providing a second elastomeric member including a second central aperture;
providing a joining member defining a joining aperture; and
passing the closure pin through the first central aperture, the joining aperture, and the second central aperture having the first elastomeric member on a first side of the joining member and a second elastomeric member positioned on a second side of the joining member, the first elastomeric member and the second elastomeric member being positioned between arms of the shackle.

14. The method of claim 13, wherein the joining member is fastened to a vehicle.

15. The method of claim 13, further comprising:
providing a guard defining
an inner seat comprising an open channel shaped to receive the shackle and extend partially around the shackle; and
an outer seat positioned opposite the open channel and shaped to support a strap passing through the shackle; and
seating the shackle in the open channel.

16. The method of claim 15, wherein the guard is detached from the first elastomeric member and has no tether secured thereto.

17. The method of claim 15, wherein:
the open channel has an arcuate axis; and
along the arcuate axis, a wall of the open channel is arcuate in a plane to which the arcuate axis is normal.

18. A method comprising:
providing an elastomeric member defining a central aperture defining a central axis;
providing a tether secured to the elastomeric member and defining a fastener for securing to a closure pin passing through a central aperture; and
inserting the closure pin through the central aperture and through arms of a shackle; and
fastening the fastener to the closure pin;
wherein the fastener comprises a barb on a distal end of the tether, the method further comprising urging the barb through a hole in the closure pin, the barb deforming to pass through the hole and thereafter resisting removal.

* * * * *

UNITED STATES PATENT AND TRADEMARK OFFICE
CERTIFICATE OF CORRECTION

PATENT NO. : 10,473,188 B2
APPLICATION NO. : 16/175631
DATED : November 12, 2019
INVENTOR(S) : Mark Alan Turner Page 1 of 1

It is certified that error appears in the above-identified patent and that said Letters Patent is hereby corrected as shown below:

In the Claims

In Column 8, Line 67 (Claim 8), remove "and".

In Column 9, Line 3 (Claim 8), add --; and-- after "aperture".

In Column 9, Line 42 (Claim 13), remove "and".

In Column 10, Line 16 (Claim 15), after "defining" add -- - --.

In Column 10, Line 38 (Claim 18), remove "and".

Signed and Sealed this
Twenty-fourth Day of December, 2019

Andrei Iancu
*Director of the United States Patent and Trademark Office*